US009444134B2

(12) United States Patent  
Fontecchio et al.

(10) Patent No.: US 9,444,134 B2  
(45) Date of Patent: Sep. 13, 2016

(54) TRANSPARENT CONFORMAL POLYMER ANTENNAS FOR RFID AND OTHER WIRELESS COMMUNICATIONS APPLICATIONS

(71) Applicant: Drexel University, Philadelphia, PA (US)

(72) Inventors: Adam K. Fontecchio, Exton, PA (US); Kapil R. Dandekar, Philadelphia, PA (US); Timothy Kurzweg, Philadelphia, PA (US)

(73) Assignee: Drexel University, Philadelphia, PA (US)

(*) Notice: Subject to any disclaimer, the term of this patent is extended or adjusted under 35 U.S.C. 154(b) by 0 days.

(21) Appl. No.: 14/554,828

(22) Filed: Nov. 26, 2014

(65) Prior Publication Data

US 2015/0116172 A1  Apr. 30, 2015

Related U.S. Application Data

(62) Division of application No. 13/266,303, filed as application No. PCT/US2010/032541 on Apr. 27, 2010, now Pat. No. 8,922,435.

(60) Provisional application No. 61/173,056, filed on Apr. 27, 2009.

(51) Int. Cl.

| | |
|---|---|
| *H01Q 1/36* | (2006.01) |
| *H01Q 1/38* | (2006.01) |
| *H01Q 1/22* | (2006.01) |
| *G06K 19/077* | (2006.01) |
| *H01Q 9/06* | (2006.01) |
| *H01Q 9/16* | (2006.01) |

(52) U.S. Cl.  
CPC .......... *H01Q 1/38* (2013.01); *G06K 19/07773* (2013.01); *H01Q 1/2208* (2013.01); *H01Q 1/2225* (2013.01); *H01Q 1/36* (2013.01); *H01Q 9/065* (2013.01); *H01Q 9/16* (2013.01)

(58) Field of Classification Search  
CPC ............. H05K 2201/0108; H05K 2201/0329; H05K 3/12; H05K 3/1241; H05K 3/125; H01Q 1/1271; H01Q 1/1278; H01Q 1/27; H01Q 1/36; H01Q 1/364; H01Q 1/38; H01B 1/10; H01B 1/12; H01B 1/121; H01B 1/122; H01B 1/124; H01B 1/125; H01B 1/127; H01B 1/128  
See application file for complete search history.

(56) References Cited

U.S. PATENT DOCUMENTS 5,261,423 A * 11/1993 Gaudlitz et al. ............... 131/88  
6,483,473 B1 * 11/2002 King et al. ................... 343/767  
(Continued)

OTHER PUBLICATIONS

PCT Application No. PCT/US2010/032541 : International Search Report and Written Opinion of the International Searching Authority, Jul. 7, 2010, 7 pages.

*Primary Examiner* — Sue A Purvis  
*Assistant Examiner* — Patrick Holecek  
(74) *Attorney, Agent, or Firm* — Baker & Hostetler LLP

(57) ABSTRACT

An optically transparent conformal polymer antenna and a method for producing the antenna from optically transparent conductive polymers. The method includes selecting an antenna design; providing an optically transparent conductive polymer material capable of being printed using an ink-jet printer device; and printing layers of the polymer in the desired antenna design pattern onto a substrate. The surface tension of the polymer solution is adjusted to allow the material to pass through a printer head for printing on a flexible substrate. The material is modified to have a higher conductivity than regular conductive polymer materials so that a suitable antenna may be formed.

9 Claims, 4 Drawing Sheets

(56) References Cited

U.S. PATENT DOCUMENTS

| | | | |
|---|---|---|---|
| 7,842,197 B2 * | 11/2010 | Kitamura | 252/500 |
| 2006/0065897 A1 * | 3/2006 | Hirai et al. | 257/72 |
| 2007/0128905 A1 * | 6/2007 | Speakman | 439/161 |
| 2008/0303140 A1 | 12/2008 | Ohtani et al. | |
| 2009/0285976 A1 * | 11/2009 | Lochtman et al. | 427/64 |

* cited by examiner

US 9,444,134 B2

TRANSPARENT CONFORMAL POLYMER ANTENNAS FOR RFID AND OTHER WIRELESS COMMUNICATIONS APPLICATIONS

CROSS-REFERENCE TO RELATED APPLICATIONS

This application is a divisional application of U.S. patent application Ser. No. 13/266,303, filed Nov. 22, 2011, which is the National Stage of International Application No. PCT/US2010/032541, filed Apr. 27, 2010, which claims the benefit of U.S. Provisional Application No. 61/173,056, filed Apr. 27, 2009, the disclosures of which are incorporated herein by reference in their entireties.

STATEMENT OF FEDERALLY SPONSORED RESEARCH

This invention was made with government support under contract DAAB07-01-9-L504 awarded by the United States Army C-E LCMC. The government has certain rights in the invention.

TECHNICAL FIELD

The present invention relates generally to optically transparent conductive polymer antennas for RFID and other wireless communications applications and to methods for fabricating such antennas on a variety of materials.

BACKGROUND

There is an increasing demand for transparent antennas that can be attached to non-traditional surfaces and materials, such as conformal antennas adhering to flexible fabrics and plastic substrates. Antennas meeting these needs have previously been prototyped through the use of conductive inks on inflexible substrates. However, while highly conductive, these ink antennas are not optically transparent and do not adhere reliably on flexible substrates.

Optical translucence allows for the potential to hide an antenna or to make the antenna virtually invisible when mounted on a transparent substrate, such as a vehicle's windshield. While conductive polymers have lower conductivities in comparison to traditional antenna materials and conductive inks, they have many advantages such as their low cost, ease of processing, and potential for all-additive ink-jet manufacturing. Previously reported conductive polymer antennas used polymers that included silver particles or were made from polymers that needed to be thick in order to achieve high conductivity. However, these previously reported antennas were neither transparent nor flexible.

Fabrication of translucent conformal antennas utilizing additive printing methods offers a stark contrast to traditional subtractive fabrication techniques generally used in circuit board and RF production, such as milling and chemical etching. As an additive process, printing can achieve patterns and geometries while using a minimum of material, which poses a large economic advantage especially when printing precious metals or other high cost materials. The additive nature of the process also allows for the use of a wide array of substrates including traditional boards such as FR-4 and ceramic-based dielectric materials. The low-temperature and non-contact nature of the process also allow for the use of many non-traditional and less rigid substrates such as plastics, polymers, fabrics, and paper.

Radio frequency identification (RFID) is a very popular technology for an increasing number of applications. The most basic passive RFID tag system consists of an interrogator (an infrastructure used to query tags) and the tags themselves. The core technology is the backscattering technique that enables very inexpensive circuits without batteries to return information to an interrogator. Because of the simplicity of the optically transparent printed conformal polymer antenna, the RFID tags can be made smaller and less expensive.

Previous work has focused on creating antennas that provide good matching and high efficiency for RFID systems. Examples of these designs include meandering dipoles, which reduce the total length of the dipole antenna by bending the two poles. Non-traditional (silver-ink) materials have been used before for RFID applications due to their low cost. However, they are not as flexible, conformal, nor as transparent as conductive polymers. Conductive polymers have been used for very low frequency applications, but due to their low conductivity have only recently been used for radio frequency (RF) applications. There are now conductive polymers that have high enough conductivity at RF frequencies to make them suitable for RFID applications. Methods are desired for using such conductive polymers to create antennas for RFID and other wireless communications applications.

SUMMARY

The present invention provides a method for reliably producing an optically transparent conformal antenna that can be attached to a variety of flexible and inflexible substrates. Such a method comprises the steps of selecting an antenna design to be applied to a substrate; providing an optically transparent conductive polymer material to a printing device, the material having a surface tension that allows the printing device to eject solution drops having a surface tension between 0.028-0.060 N/m, and printing desired pattern layers of the material onto the substrate according to the antenna design. Ultrasonic vibration may be applied to the material to remove gases before the antenna design is printed. Also, dimethyl sulfoxide may be added to the conductive polymer material to increase conductivity and a surfactant may be added to the conductive polymer material to lower surface tension. The printing step may be optimized by applying multiple layers of the materially sequentially to allow drops to flow together into a thicker trace.

In an exemplary embodiment of the invention, the optically transparent conformal polymer is attached to a substrate through an inkjet printer utilizing microstrip antenna technology. In particular, the methods of the invention are used to create anoptically transparent conductive polymer antenna comprising a non-traditional substrate such as glass or a flexible substrate such as a flexible plastic, a polymer, a fabric, or paper, and an antenna printed on the substrate. The antenna is formed from a conductive polymer material having a surface tension between 0.028-0.060 N/m so as to enable the material to pass through a print head for printing on the flexible substrate. The spacing between printed drops is preferably between 5 μm and 254 μm. The antenna may be connected to a machine-readable identification tag to produce an RFID unit such that the antenna radiates in response to an interrogation frequency from an interrogator unit. A power source for the antenna may also be provided so that the antenna may be used for transmitting and receiving. A signal processor may be used so that signal received by the antenna can be produced. In an exemplary embodiment, the conductive polymer material includes dimethyl sulfoxide and a surfactant and has a conductivity of at least $5 \times 10^5$ S/m. The antenna may also be formed as a center-fed dipole antenna designed for a resonant frequency of 900 MHz.

DETAILED DESCRIPTION OF ILLUSTRATIVE EMBODIMENTS

A. Fabrication Techniques

Figure 1:
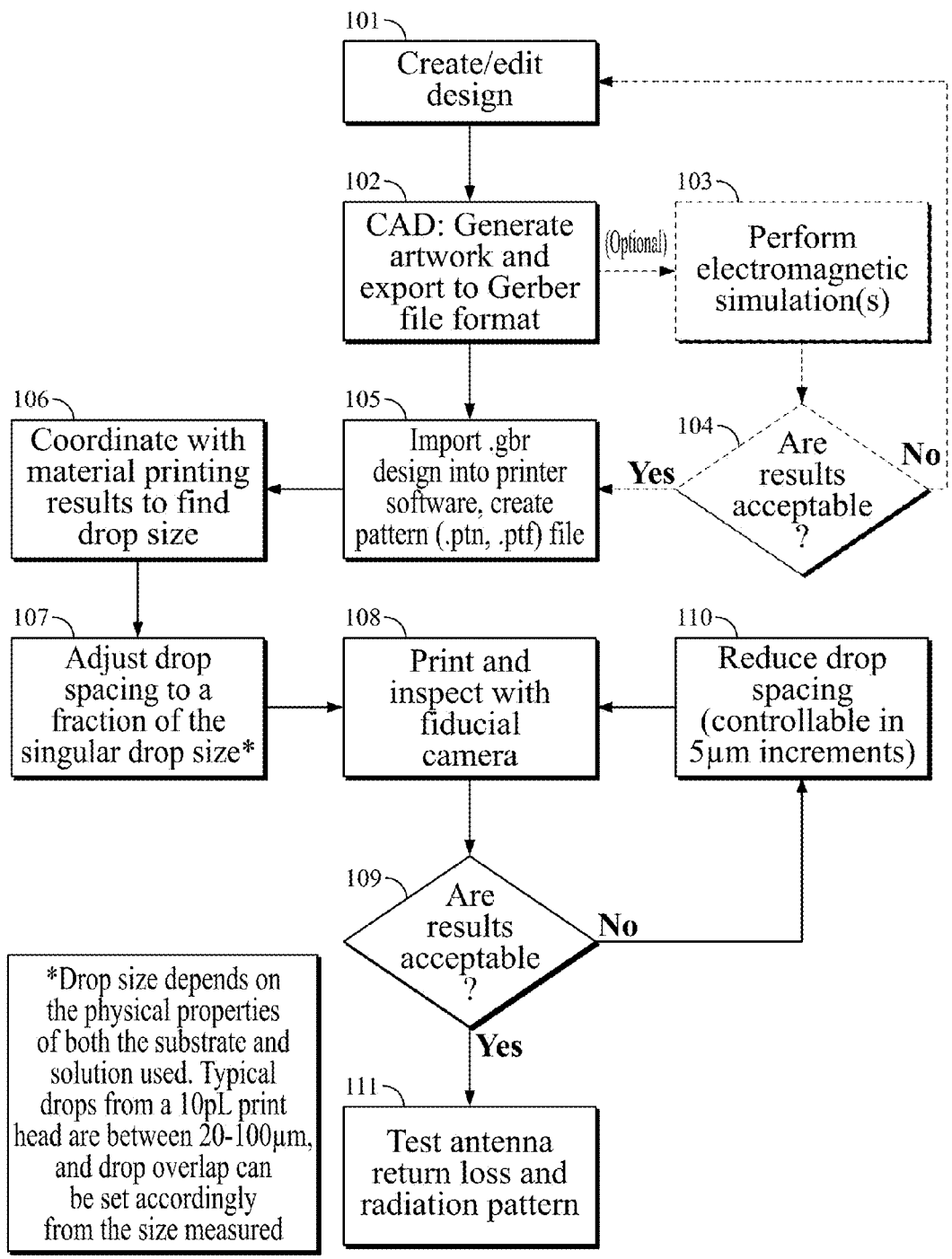
FIG. 1 illustrates the process of designing, printing and testing an antenna in accordance with the invention.

Screen printing and mask-bake deposition were initially used to make antennas; however, these methods offer very little control over layer thickness and limits printed patterns to simple and fairly large shapes. Inkjet printing, in contrast, offers extensive control over these factors but also introduces many new variables into the fabrication process. Most of these new variables can be classified into either solution formulation and physical property issues or process issues, though there are some that span both categories. All samples were fabricated with a Fuji-Dimatix DMP-2831 materials printer. For the solution to be compatible with the inkjet print head it must first possess certain physical properties. Viscosity is ideally such that the fluid can be manipulated by the electronically actuated microelectromechanical membrane of the DMP-2831 materials printer, in the range of about 5-25 cPs. The surface tension of the solution is also important, as it will control the amount of driving force from the printing membrane needed to forcefully eject a drop out of the print nozzle. Ideal solution surface tension ranges from 0.028-0.033 N/m though solutions up to 0.060 N/m can be printed with reduced drop velocities. Volatility plays a key role as fluids that evaporate quickly can leave behind particles that will clog the print nozzles and render them useless or lead to streaky and unreliable printing.

The inventors fabricated antennas out of a conductive polymer, a general PEDOT-PSS. By specification, this polymer has a conductivity of 300 S/m. The polymer was modified with 10% dimethyl sulfoxide (DMSO) to increase the conductivity, and 2% surfactant (such as Tween-21) to lower the surface tension. Through testing, it was discovered that the conductivity of the modified solution is approximately $5 \times 10^5$ S/m, which is over two magnitudes higher than the stock PEDOT-PSS and much closer to the conductivity of copper ($5.9 \times 10^7$ S/m). Solutions with conductivities of at least $5 \times 10^5$ S/m are desired for the applications described herein.

While all of these properties affect the fluid while inside the print head, they are also important once the drop is in free fall and after touch down on the substrate. The drop size formed upon ejection from the nozzle, as well as the shape of any ligaments and/or satellite drops, is a function of the solution's physical properties and the driving waveform. An extremely volatile liquid can also leave behind residue at the nozzle opening, causing drops to be deflected at angles other than the desired vertical upon ejection. Evaporation on the substrate also can play a role in how large each drop spreads after landing, affecting layer continuity and the necessary drop spacing. Once the drop of fluid has traversed the free space between print nozzle and substrate, the choice of substrate will come into play. Every substrate will have different wettabilities, which also change drop spreading, causing the drop to spread or dewet into a smaller footprint.

Coupled with solution formation and physical property issues, the printing process itself also introduces many new variables. The spacing between printed drops can be set from approximately 5-254 µm. This allows for excellent control over drop overlap and layer uniformity which leads to conductivity across the PEDOT-PSS conductive polymer layers. Drop dynamics and varying time between drops or layers must be considered. Every pattern printed consists of a different number of total printed drops. Also, each change in drop spacing will change the total drop count. A different amount of drops will result in a change in the printing time, affecting drop overlap and layering as a function of wetting (viscosity, surface tension, and substrate dependent) and volatility. The eventual goal of maximal conductivity in PEDOT:PSS layers is achieved when the conductive polymer chains are allowed to orient in solution across the entire plane of the printed layer. By setting the spacing of printed drops in close enough proximity to allow the drops to flow together into one continuous pool rather than individual drops, consistently maximal conductivity is ensured. Layer thickness, and therefore conductivity, can be controlled by sequentially applying multiple layers of polymer.

B. Analysis of Conductive Polymer

In order to better understand the effects of the printing technique on the performance of the conductive polymer, several test samples have been printed on a PET (polyethylene terephthalate) substrate and characterized. A series of uniformly shaped rectangles were printed, varying in both the drop spacing, and number of print layers. The different drop spacing distances tested were 10 µm, 25 µm, and 50 µm. The rectangles were fabricated at these drop distances for 1, 2, 5, and 10 layers. Once printed, the test samples were observed under an optical profilometer to determine the thickness of the samples. Then the sheet resistance was measured using a 4 point probe. The results were compared to determine the effect on sheet resistance by both the printed film thickness, and the droplet spacing. They were observed under an optical profilometer to observe both the topography of the sample, to confirm that the samples are uniform, and the step size. It was found in FIG. 2 that the thickness varied greatly among samples of the same number of layers, based on the droplet spacing.

Figure 3:
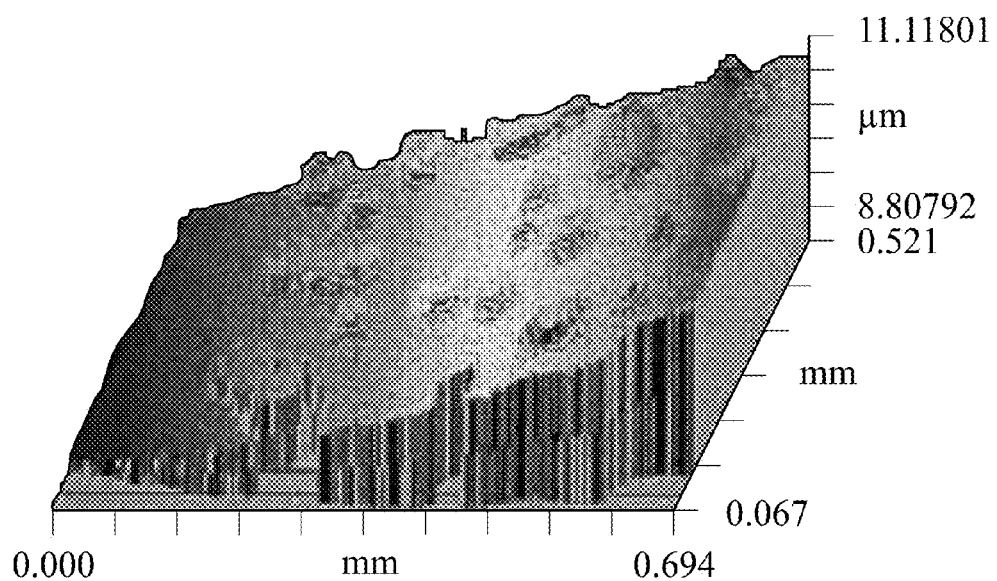
FIG. 3 is a topographical profilometer image that shows the droplets spacing being too large, resulting in a non-uniform layer.

It was also found that the samples fabricated with 50 µm droplet spacing have little to no effectiveness with respect to conductivity. The distance between the drops is too great for them to fuse together or to create a single layer. The two layer 50 µm spacing sample measured on the order of hundreds of k/sq sheet resistance, and the one layer sample could not return a measurable resistance value at all. FIG. 3 is a topographical profilometer image that shows the droplets spacing being too large, resulting in a non-uniform layer. It was found that as the thickness of the sample increases, the sheet resistance tends to decrease. Also, the test results show that as the droplet spacing decreases, the sheet resistance also decreases. This occurs because as the distance between droplets is decreased, more droplets are needed to fill the same pattern area. Thus, there is more conductive material in the same area, increasing the overall conductivity. The profilometer images also show that the samples with a more uniform surface have a much lower sheet resistance. The five layer, 10 µm spacing sample has a uniform surface within 60 nm on average. The five layer, 1 micron spacing sample has a much lower uniformity, as can be seen by the profilometer image of FIG. 3. The tests performed on the inkjet printed conductive polymer samples show that the most conductive thin films tend to result from a smaller drop spacing, and a greater number of layers printed on top of each other. While there were some results that go against this trend, they are a result of the affect the four point probe had on the samples, and do not represent the undamaged sheet resistance values of the material.

In an exemplary embodiment of the invention, a materials printer, such as, but not limited to, a Fuji-Dimatix DMP-2831, is used in the antenna fabrication process. In accordance with this method, prepared solutions of conductive inks and polymers are injected into the printer's cartridges and printed out of a programmable number of the print head's nozzles. Each of these nozzles can be actuated by a micro-electromechanical silicon membrane with a controllable driving waveform creating a pressure wave that ejects fluid from the nozzle. Several different cartridges with varying nozzle sizes are available, allowing a degree of control in drop size from a few microns to tens of microns. Drop spacing is also fully controllable from less than 5 µm to 254 µm, allowing another degree of freedom in affecting layer thickness and drop overlap. Such robust control over drop size and spacing allows for the printing of complex patterns and geometries within a few minutes.

FIG. 1 illustrates one embodiment for designing and printing antennas in accordance with the invention. The first step 101 is the creation and editing of the design. Once the antenna is designed, the corresponding artwork is created in the next step 102 using computer aided design and exported as a file in a format such as the Gerber file format. An optional step 103 includes performing electromagnetic simulations on the designed antenna to create a profile. Following the test, a decision must be made regarding the acceptability of the results 104. If the results are not acceptable, the antenna is redesigned. On the other hand, if the results are acceptable, the design is sent via the file to a printer software application where the pattern is created 105. The material printing results are analyzed to determine the proper drop size 106. Layer analysis is performed through an optical profilometer for a measurement of the thickness of the antenna. If a more detailed layer analysis is required, the antenna can be placed into a scanning electron microscope. Conductivity analysis can be performed by both a DC resistance measurement, and an AC 4-point probe analysis. An analysis with an optical spectrometer is used to determine the transparency of the antenna. Through these analyses, the trade-off between greater layer thickness/conductivity and transparency is determined, resulting in any required drop size and spacing alterations to achieve the design goals. The drop spacing is then adjusted to a fraction of the singular drop size 107, creating drop overlap between neighboring drops, allowing for a thicker trace, resulting in higher conductivity. The antenna is printed and then optionally inspected with a fiducial camera 108. The acceptability of the results determine if the drop spacing must be further reduced and the antenna reprinted or if the return loss and radiation pattern of the antenna will be tested. 109, 110, 111.

Figure 2:
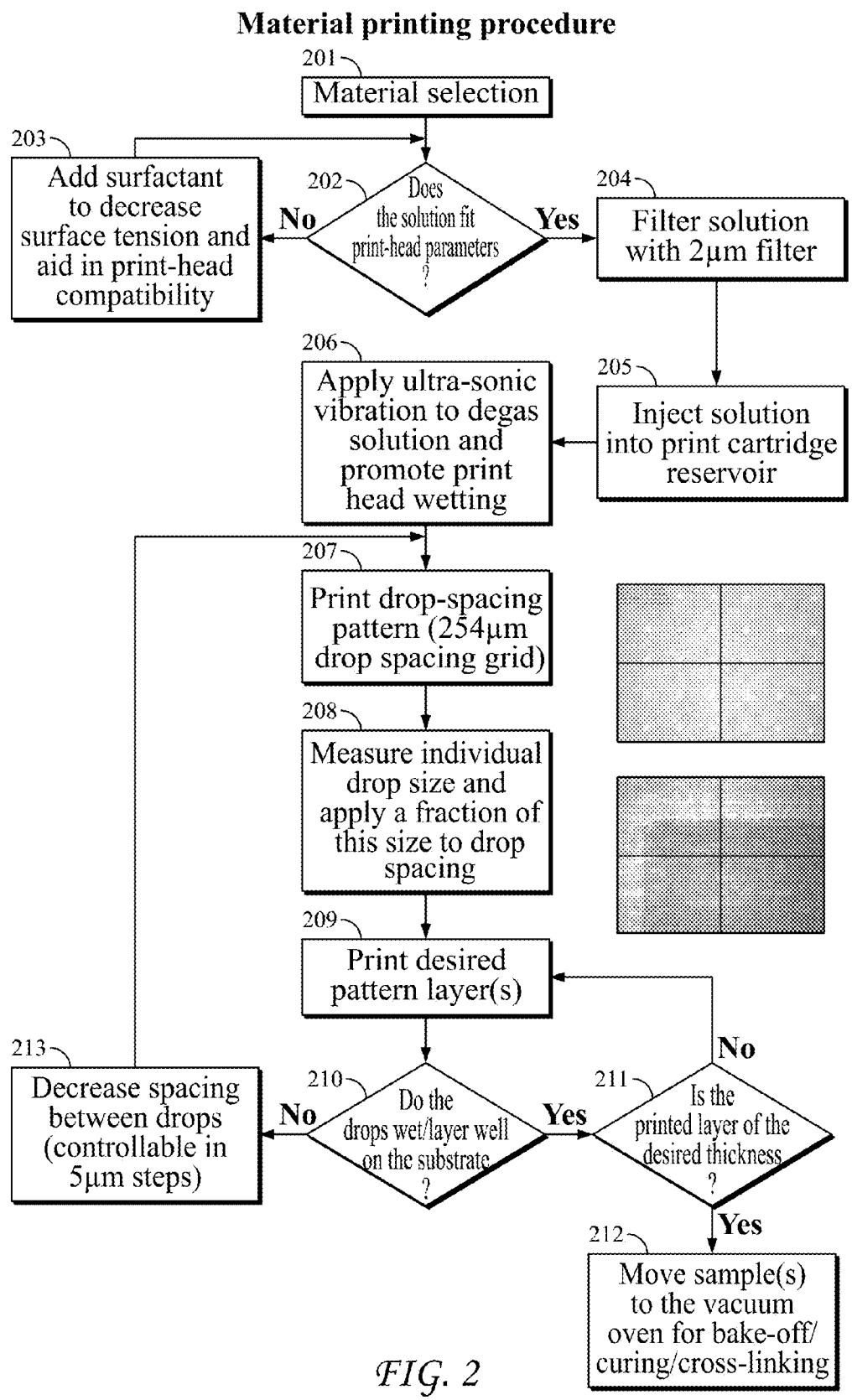
FIG. 2 illustrates the procedure for printing the polymer antenna in accordance with the invention.

FIG. 2 illustrates the materials printing procedure. A conductive polymer is selected based on conductivity requirements 201. Dimethyl sulfoxide can be added to the polymer to increase the conductivity if necessary. It is then determined if the solution conforms to the printer head parameters 202. If the solution does not conform, a surfactant is added to decrease surface tension and aid in printerhead compatibility 203. The solution is then passed through a 2 µm filter 204. The solution is then injected into a print cartridge reservoir 205. Ultrasonic vibration is applied to the solution to remove gases and promote print head wetting 206. A drop spacing pattern is then printed (5 µm to 254 µm drop spacing grid) 207. The size of the individual drops is measured and a fraction of the size measured is applied to the drop spacing 208, creating drop overlap between neighboring drops, allowing for a thicker trace, resulting in higher conductivity. The desired pattern is then printed 209. If the drop profile is acceptable (layer, thickness, etc.) then the sample is moved to the vacuum oven for bake-off/curing and cross-linking 210, 211, 212. If the drop profile is not acceptable, the spacing between the drops is decreased and new drops are printed 213.

The printed antennas make use of microstrip antenna technology. The printed antennas can be realized by using conductors with different sizes and shapes. The printed conformal polymer antennas that are the topic of this invention are unique at least in part because the conductors have controllable levels of optical transparency, can be fabricated on non-traditional substrates (i.e., glass and fabrics such as neoprene, vinyl, polyester, and Kevlar), and use materials that are deposited in an additive manner (i.e., rather than being mechanically or chemically etched).

Specific performance measures and how they are effected by the material and printing process include frequency, power handling, transmission range, form factor, and antenna performance. These factors are elaborated upon below.

Frequency

The microwave frequency range of interest for printed polymer antennas spans the UHF, S, and C bands (roughly 100 MHz-8 GHz). Limitations in regard to feature size possible through printing are irrelevant with regard to the small features, as the shortest wavelengths in question are several orders of magnitude larger than the current minimum printer drop spacing of 5 µm. There are no limitations in pattern complexity or discontinuity; however, minimum feature size must be above the 5 µm spacing between drops, or allow for drop sizes around 5-100 µm depending on the solution, substrate, and print head size used. While an increase in thickness of the polymer layer shows higher conductivity, there is a compromise where edge resolution decreases with increasing layer thickness. This is due to a "puddling" effect where the surface tension of the puddle formed begins to deform the deposited layer from the desired pattern causing non-uniform evaporation of the solvent.

Power Handling

No power handling maximum has been reached. Screen-printed samples of microstrip transmission lines and both dipole and patch antennas have been tested with success up to 5 W which exceeds the power requirements of most applications of printed polymer antennas.

Transmission Range

There is a tradeoff that can be adjusted, depending on the application, between transparency and conductivity. Both layer thickness as well as solution composition can be controlled to create thicker, more conductive, and less transparent layers or the opposite in thinner, less conductive, but more transparent layers. The solution composition can be modified with the addition of deionized water for a simple dilution, giving more space in the solution between polymer chains and thus a higher transparency. The composition can also be modified with a surfactant, such as Tween 21, which decreases the solution's surface tension causing printed patterns to wet or to spread more on a substrate, effectively spacing the polymer chains out through this metric. The decreased surface tension also makes the polymer droplets more compliant with the inkjet print heads. Additionally, 5-10% dimethyl sulfoxide (DMSO) is added to the conductive polymer solution to increase conductivity. DMSO has a negligible effect on the printing and other physical properties of the polymer solution.

Form Factor

The room-temperature printing process and variety of curing processes including the relatively low-temperature baking/curing cycle at 70° C. allows for the use of a wide array of substrates such as transparent and conformal polymers and plastics, where traditional metal processing and deposition is done at much higher temperatures well above the melting point of these materials. More traditional materials such as ceramics, fiberglass, glass, and metals can also be used, as can virtually any substrate that fits the size requirements of the printer used to produce the antenna. It is also possible to print on substrates that are non-uniform in shape or height, including curved structures.

Antenna Performance

All of the aforementioned compromises in thickness, conductivity, transparency, and solution formation are undeniably tied to the final printed polymer antenna performance. Each of these can be tuned as a specific applications mandate. There is also the physical current flow to be considered, specifically with respect to the Skin Effect which plays a large role in thin film conductors carrying alternating current. The skin effect is the phenomenon in which an alternating current tends to concentrate in the outer layer of a conductor, caused by the self-induction of the conductor and resulting in increased resistance. At a frequency of 2.4 GHz, calculation would suggest a skin depth on the order of tens of microns for printed polymer layers. Therefore, extremely thin inkjet-printed antennas on the order of several microns will not perform at the same levels as those printed at several skin depths, at or above 100 μm. Higher-frequency devices will require a smaller skin depth, and conversely lower-frequency devices will require larger skin depth. This effect must be taken into account when designing and printing antennas with a minimal cross-sectional profile.

APPLICATIONS

Figure 4:
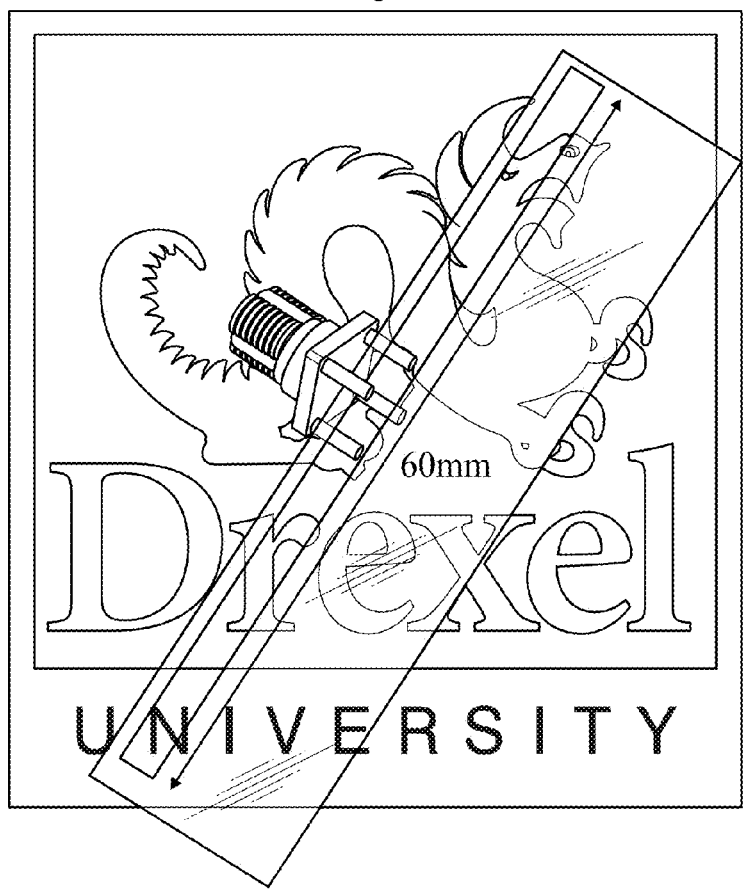
FIG. 4 is a sample 2 dipole antenna.

Examples of Optically Transparent Conductive Polymer Antennas: Dipole and Meandering Dipole Antennas 2 Dipole Antenna The initial fabricated conductive polymer (CP) antenna was a simple center-fed dipole antenna. The antenna was designed for a resonant frequency of 900 MHz. Practically speaking the antenna is too large for RFID purposes, which is why a meandering dipole is presented below. However, it provides a good baseline design for future prototypes. The dimensions of the antenna are 150 mm long and 3 mm wide as seen in FIG. 4.

Figure 5:
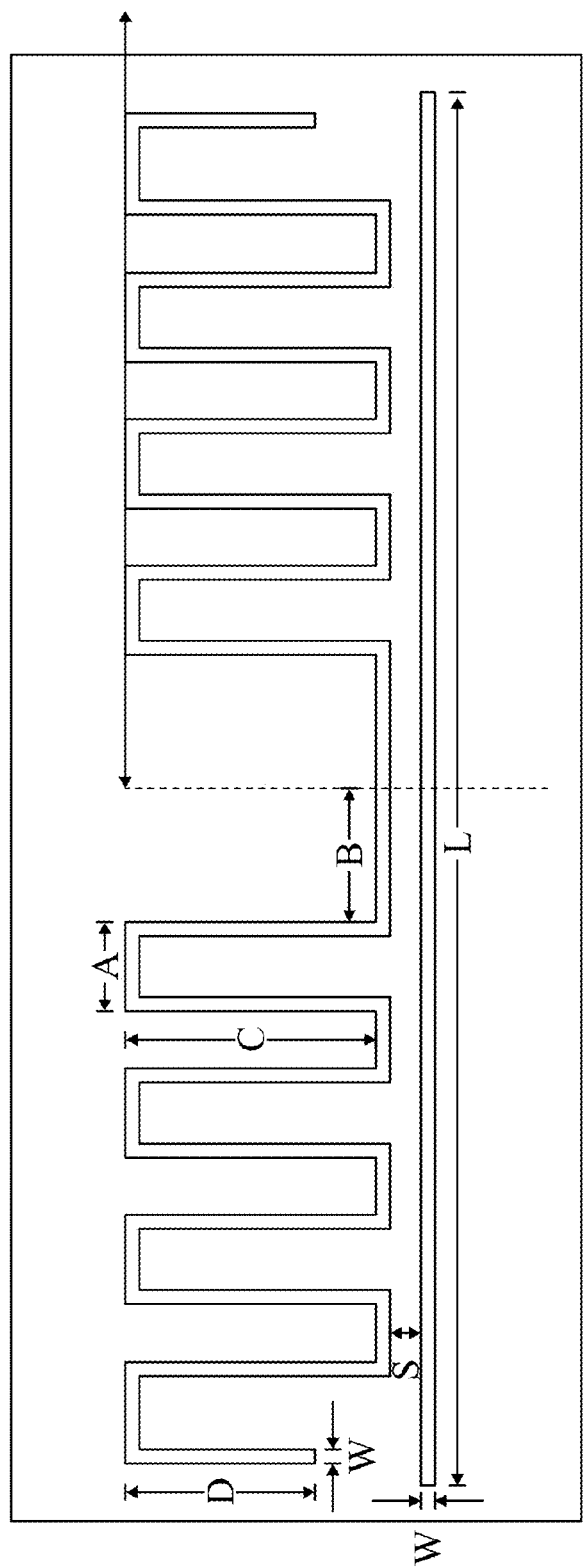
FIG. 5 is an example of an RFID meandering dipole antenna and diagram.

Meandering dipoles reduce the total length of the antenna, which is ideal for RFID tags. The inventors chose a design similar to previously reported designs to easily match to the highly inductive load of typical RFID circuits. The resulting antenna, as seen in FIG. 5, is designed for 900 MHz center frequency and has physical dimensions listed in Table I. Table 1 lists the dimensions for the meandering dipole antenna using quantities labeled in FIG. 5. FIG. 5 also demonstrates the flexibility of the antenna. The meandering design reduces the antenna size by 50% (relative to the 2 antenna), to a total length of 76 mm. The final segment of the antenna, seen as D in FIG. 4, can be trimmed in order to tune the antenna to the correct resonant frequency. The conductor and ground feeds go through the substrate and are connected to the antenna trace with solder and silver paint for the copper and conductive polymer antennas, respectively.

TABLE 1

Variables for the meandering dipole antenna using quantities Labeled in FIG. 5

| | Variable (mm) | | | | | | |
|---|---|---|---|---|---|---|---|
| | A | B | C | D | L | S | w |
| Value | 4 | 7 | 11 | 8 | 76 | 1.5 | 0.7 |

One embodiment of an application for optically transparent printed conformal antennas is cell phones and base stations. For cell phones, the antennas could be conformal on the outside of a mobile device, integrated into clothing of a cell phone user, or printed on the windshield of a vehicle. Antennas for common cellular frequencies operating with the full range of transmission powers can be realized. All previously published cellular handset antenna designs can be realized using the proposed technique. However, a key difference is that since the antennas can be transparent and printed conformally on a mobile device or external structure, space on the internal circuit board of the mobile device does not need to be used for the antenna (potentially allowing the mobile device to be smaller).

For cellular base stations, rather than using antennas mounted on a cellular tower, antennas can be made transparently and integrated into windows that are high off the ground or on the sides of buildings. Thus, cellular base stations can be constructed that are visually unobtrusive. By logical extension, antenna arrays can also be constructed to provide multidirectional signal coverage.

Another embodiment of optically transparent printed conformal polymer antennas in accordance with the invention includes applications in local and personal area networks making use of Wi-Fi (IEEE 802.11), WiMAX (IEEE 802.16), Bluetooth (IEEE 802.15.1) and/or ZigBee (IEEE 802.15.4). Optically transparent printed conformal polymer antennas could be used in both nodes in the network and access points (when they are present). Antennas for mobile network devices could be realized in much the same way as for cellular phones, and all existing network antenna architectures can be realized using the printed polymer antenna technology. With the increasing trend to assign network addresses to a much greater number of devices (e.g., PDAs, iPods, and home appliances), the ability to unobtrusively deploy an antenna transparently on the packaging of the device rather than occupy valuable space within the device can provide significant improvements in terms of device size and form factor. Access points, when appropriate in the network topology, can be improved in much the same way as the cellular base stations discussed in the previous section.

Another embodiment of optically transparent printed conformal polymer antennas includes applications for satellite communications, including satellite radio (XM, Sirius, etc.), Satellite TV (DirectTV, Dish, etc.), satellite data such as internet data, and Global Positioning Satellite (GPS) systems. The antennas and antenna systems are therefore capable of both transmit and receive, and have ranges up to and possibly beyond Geosynchronous Earth Orbit at ~23,000 mi. All published and realizable antennas designs for these systems are expected to be realizable in the printed antennas. Example implementations include, but are not limited to, direct print on handheld devices and vehicles, printing on stickers which can be affixed to devices, buildings, structures, or vehicles, and lamination within clearcoat, and other types of encapsulation coatings.

Another embodiment of optically transparent printed conformal polymer antennas is radio frequency identification (RFID). The RFID unit includes a machine-readable identification tag connected to the antenna. The antenna is adapted to radiate in response to an interrogation frequency from an interrogator unit. The RFID unit may also include a power source for the antenna for transmitting and receiving and a signal processor for receiving. A novel way to create antennas of a size suitable for RFID tags and that are optically transparent and can conform to different shapes is through the use of conductive polymers. Non-traditional (silver-ink) materials have been used before for RFID applications due to their low cost. However, they are not as flexible, conformal, nor as transparent as conductive polymers.

The printed antenna technology of the invention allows for quickly and inexpensively fabricated RFID antennas. With the advantage of transparent antennas, the RFID applications could include: Inventory tracking (RFID antennas could be printed directly on packaging/clothing, where it would be invisible to the consumer); EZ-Pass-type applications (instead of a plastic box being Velcroed on the windshield, a transparent antenna on a substrate could be stuck onto the car windshield, eliminating any visual obstructions to be used to for road tolls and parking); Rescue/Emergency worker locating (allowing emergency workers, when going into a dangerous situation, to be fitted with an unobtrusive antenna for location finding); Location finding (where, for example, an antenna could be directly printed onto a lift pass at a ski resort, and if a skier is lost, tracking could be performed); and public transportation payment option (public transportation payment options such as bus, rail and subway).

The above listed applications using the printed polymer material have trade-offs, including transparency vs. read range of the RF antenna. Therefore, each application and their desired performance will have to be evaluated when fabricating the antenna.

What is claimed:

1. An optically transparent conductive polymer antenna comprising:
    a flexible substrate; and
    an antenna printed on said flexible substrate, said antenna comprising an optically transparent conductive polymer material not having any electrically conductive particles added to the conductive polymer material, said material having a conductivity that is at least $5 \times 10^5$ S/m and a surface tension between 0.028-0.060 N/m so as to enable said material to pass through a print head for printing on said flexible substrate.

2. The antenna of claim 1, wherein the antenna is printed on said flexible substrate whereby spacing between printed drops is between 5 μm and 254 μm.

3. The antenna of claim 1, wherein the flexible substrate comprises at least one of a flexible plastic, a polymer, a glass, a fabric, and a paper.

4. The antenna of claim 1, further comprising a machine-readable identification tag connected to the antenna to produce an RFID unit.

5. The antenna of claim 1, wherein the antenna is adapted to radiate in response to an interrogation frequency from an interrogator unit.

6. The antenna of claim 1, further including a power source for the antenna for transmitting and receiving.

7. The antenna of claim 1, further including a signal processor for the antenna for receiving.

8. The antenna of claim 1, wherein the material includes dimethyl sulfoxide and a surfactant.

9. The antenna of claim 1, wherein the antenna comprises a center-fed dipole antenna designed for a resonant frequency of 900 MHz.

* * * * *